United States Patent Office 3,549,555
Patented Dec. 22, 1970

3,549,555
ENCAPSULATION OF LIPOPHILIC LIQUID-IN-HYDROPHILIC LIQUID EMULSIONS
Everett N. Hiestand, Galesburg, and Erik H. Jensen and Peter D. Meister, Kalamazoo, Mich., assignors, by mesne assignments, to The National Cash Register Company, Dayton, Ohio, a corporation of Maryland
No Drawing. Continuation of application Ser. No. 355,416, Mar. 27, 1964, which is a continuation-in-part of applications Ser. No. 781,916, Ser. No. 781,925, Ser. No. 781,926, and Ser. No. 781,927, all Dec. 22, 1958. This application Oct. 8, 1968, Ser. No. 776,296
Int. Cl. A01n 17/00; A61k 9/04; B01i 13/00
U.S. Cl. 252—316
33 Claims

ABSTRACT OF THE DISCLOSURE

A process for encapsulating a hydrophobic liquid in aqueous emulsion with a wall-forming polymeric material comprising causing a coacervate solution of the wall-forming polymeric material to deposit about the hydrophobic liquid in aqueous emulsion and hardening the capsule wall; also the capsular product produced from the aforedescribed process, which product is useful where ever there is need to maintain the hydrophobic liquid in aqueous emulsion in isolation from contiguous environment or there is need to control the release of the said emulsion through its capsular wall.

---

The subject matter of this application is a continuation of Ser. No. 355,416, filed Mar. 27, 1964, now abandoned; said 355,416 being a continuation-in-part as to each of but claiming nothing more than is collectively disclosed in Serial Nos. 781,916, 781,925, 781,926 and 781,927, all filed Dec. 22, 1958 and now abandoned.

This invention relates to a process of encapsulating minute particles en masse in a liquid manufacturing vehicle by forming liquid-liquid phases of wall-forming polymer solution (e.g., coacervate) and equilibrium liquid (manufacturing vehicle), and to a capsule product having a core and a seamless protecting polymeric wall surrounding the core, said product resulting from the process. More particularly, the invention relates to a process for encapsulating lipophilic-liquid-in-hydrophilic-liquid emulsion particles including a step of forming a dispersed coacervate phase of a polymeric wall-forming solution in a continuous phase of equilibrium liquid as a vehicle.

The capsule-forming process of this invention involves the establishment of a system that is characterized as follows (these terms being defined below):

(1) It is in an agitated state.
(2) It comprises the following three phases, characterized by being mutually immiscible but compatible and further characterized, respectively, as being:

(a) a continuous liquid phase (vehicle) in equilibrium with phase (c) below,
(b) a discontinuous phase of minute, mobile entities of emulsion particles (core material) comprising a lipophilic (oil) liquid-in-hydrophilic liquid emulsion dispersed in the vehicle, and having a thickening agent, in the hydrophilic lqiuid and
(c) a discontinuous polymer-rich phase of minute, mobile entities of wall-forming material dispersed in the vehicle.

This system results without more in a deposit of the wall-forming material around the entities of core material, the coacervate phase being capable of deposit around the dispersed entities of core material and also capable after deposit of maintaining itself as a wall against the shearing forces that exist as an incident of the required agitation of the system. The deposits quickly accumulate to a maximum thickness which may be varied by varying the amount of the wall material provided and the degree and type of agitation used, which may vary in accordance with the need for protection of the core material and the protective characteristics of the wall-forming material selected for use.

As employed herein, the term "lipophilic" is applied to those materials having relatively strong attractive forces for low dielectric constant and non-polar media. The term "hydrophilic" refers to those surfaces having relatively strong attractive forces for high dielectric constant and polar media.

In one form of the process of this invention, the capsules are prepared by first forming a primary lipophilic liquid-in-hydrophilic liquid emulsion having a thickening agent in the hydrophilic or external phase. The primary emulsion is then dispersed in a solution of the wall-forming polymeric material and a liquid-liquid phase separation (coacervation) caused to occur to thereby form three phases, the core material and two liquid phases comprising a coacervate of the wall-forming polymer and the equilibrium liquid thereof, whereupon the coacervate deposits about the dispersed primary emulsion particles.

"Liquid-liquid phase separation" refers, as used herein, to the separation of a solution (or a sol) of a wall-forming polymer or plurality of said polymers into two distinct liquid phases, one designated as the polymer-rich phase and the other the polymer-poor phase; said separation otherwise known as "coacervation." For purposes of this application, the separation phase termed a "solution of the wall-forming polymer" includes a liquid phase wherein the wall-forming polymer is present in the liquid in what is commonly referred to as the "sol" state. Thus, in one form, a coacervate is a polymer-rich solution which has separated from an original single-phase polymeric solution, leaving also a polymer-poor solution or equilibrium liquid. The coacervate appears initially as a fine dispersion of microscopic droplets of polymer in the equilibrium liquid (vehicle). When formed in a pure colloidal system, these droplets are essentially homogeneous. However, if minute immiscible particles are dispersed in the system, the coacervate forms around these materials. Technically, the term "coacervation" therefore relates to the process by which, in part, the liquid-wall-forming polymer concentrate or coacervate is formed as a phase entity of an initial solution of the wall-forming polymer. In its practical aspect, and as employed herein, "encapsulation by coacervation" relates, in one aspect, to the process by which core material present in the pristine polymer solution when the coacervate is formed is enveloped or encapsulated by the coacervate. Where the coacervate comprises a single wall-forming polymer, the process is termed "simple coacervation"; when more than one wall-forming polymer is present in the coacervate and the different molecules are brought together by electric charge of opposite sign, the process is called "complex coacervation." Complex coacervation, in one form of the invention, involves the separation of at least two wall-forming polymers of opposite electric charge to form the coacervate phase. Thus, after separation, one phase contains the said coacervating polymers in high concentration, and the other phase (equilibrium liquid) contains the polymers in relatively low concentration, these phases being known as the polymer-rich phase and the polymer-poor phase, respectively.

It is essential that, if one or more of the wall-forming polymers is temperature-gelable, the depositing or wrapping of the primary emulsion with the coacervate be carried out at a temperature above the gel point of the gelable polymer. Moreover, in the case of complex coacervation, if one of the polymers be an isoelectric colloid, then the coacervation is carried out at a pH such that polymers of opposite electric charge are present.

While encapsulation of minute particles, utilizing the phenomena of coacervation and the resultant coacervate phase, has been described above in terms of effecting a phase separation from an initial wall-forming polymer solution and in the presence of the particles to be encapsulated, it is to be understood that the order of addition of the particles is not critical; i.e., the particles may be added to the system before or after the phase separation or coacervation has taken place. Moreover, the relative amounts of the several components of the system that produce the coacervate state having once been established, appropriate amounts of the several materials composing the coacervate-equilibrium liquid phase may be admixed and a coacervate state produced without need of forming an initial solution of the wall-forming material.

Coacervation has long been known as a phenomenon primarily of academic interest, and only in recent years has it been developed for commercial utilization. United States Pats. Nos. 2,800,457 and 2,800,458 disclose methods for encapsulating oil droplets by coacervate coatings of the complex and simple types. This invention is an improvement over the aforementioned prior patents in that it provides a stable or intact lipophilic liquid-in-hydrophilic liquid emulsion entity for encapsulation by coacervates of wall-forming polymers.

It has now unexpectedly been found that dispersed particle-entities of a lipophilic liquid-in-hydrophilic liquid emulsion may be encapsulated by a coacervate, if the hydrophilic phase contains a substance, herein designated a thickening agent. In some manner, the thickening agent and the internal phase (oil) impart to the outer surface of the external phase the surface characteristics necessary for coacervate depositions.

The present process and products resulting therefrom provide an improvement in the provision of impermeable coatings of high strength or coatings which permit a gradual release of contents for water-soluble materials broadly. For example, encapsulated emulsion particles can be prepared containing appropriate materials in the emulsion phases for use as sustained release fertilizers, plant growth hormones, and pesticides such as fungicides, nematocides, bacteriocides, viricides, and the like for agricultural use. In addition, ingredients can be incorporated in pre-mixed foods which could not normally be included because of loss in the drying process, the encapsulated ingredients being liberated by the shearing force exerted in a mixing step prior to actual use. Similarly, vitamins, notably combinations of water-soluble and oil-soluble vitamins, can be incorporated into dry cereal preparations for release in the body. Cosmetics can be prepared in which the topical agent is enclosed by impermeable but readily destructible coacervate shells. Pharmaceutical materials can be encapsulated for sustained release in the body upon contact with a predetermined pH environment or enzyme system, or where stability, odor, taste, or incompatibility problems are present. Such materials can be enclosed in coatings suitable for oral, topical, or injectable use by regulation of the particle size and coating thickness, permeability and hardness, or by selection of coating components. Insecticides with selective toxicity for insects but which are relatively non-toxic toward humans can be encapsulated, for example, with coacervate coatings which are highly impermeable except in the presence of enzymes of the insects. Rodenticides which are effective on ingestion by the animals but which have odors that forewarn or repel them can likewise be coated by the method of this invention with virtually complete impermeability with respect to the odor.

In addition to emulsions containing soluble or suspendable materials in the hydrophilic liquid phase, the coacervates herein, by practice of the present invention, can be deposited about any emulsion containing dissolved or suspended material in the oil phase. The ingredients to be dissolved or suspended in either the hydrophilic liquid or the oil phase of the primary emulsion are limited in selection only by the solubility, suspending characteristics, or compatibility of the ingredients. Moreover, the present process is applicable also to the encapsulation of particles already enclosed within a coacervate membrane-wall. Thus, in effect, a dual coacervate wall can be prepared for the further protection of an already-enclosed emulsion, a simple or complex coacervate being deposited over an existing simple or complex coating.

The term "hydrophilic liquid" is intended to include water, aqueous solutions or suspensions, and non-aqueous solutions or suspensions immiscible in the oil phase of the primary emulsion.

As employed herein, the term "primary emulsion" refers to the lipophilic-liquid-in-hydrophilic-liquid emulsion formed from the hydrophilic liquid, with or without dissolved or suspended ingredients, and the selected oil, with or without dissolved or suspended ingredients. The selection of said oil is not critical and is dependent on the function to be served by the oil; i.e., as a solvent or suspending medium in addition to its function as an internal phase of the primary emulsion. Thus virtually any animal, vegetable, mineral, or synthetic oil having the desired physical characteristics can be employed for this purpose. Lanolin, corn oil, soybean oil, castor oil, cod-liver oil, and mineral oil are examples of such oils. The conventional emulsifying agents, such as esters of polyhydric alcohols, sorbitan derivatives, and polyoxyethylene derivatives, are usually employed to facilitate the formation of the said primary emulsion. The HLB (hydrophile-lipophile balance) system, described in "Remington's Practice of Pharmacy," Eleventh Edition, Mack Publishing Company, 1956, page 191, offers a convenient method for selection of the specific emulsifiers. Thus, by noting the HLB requirement for the particular emulsion system involved, an appropriate agent or combination of agents can be selected which will facilitate the formation and stabilization of the desired emulsion. As with all emulsion formation problems, selection of the most suitable agents must ultimately be based on trial. Accordingly, a sample of the emulsion should be checked (for example, by diluting and agitating with a relatively large volume of manufacturing vehicle) to determine that a stable emulsion of the type desired has actually been obtained. Additionally, the selected emulsifying agents must be compatible with the formation of a coacervate.

The thickening agents used herein are materials which are substantially insoluble in the oil phase of the primary emulsion and are capable of increasing the viscosity of the external hydrophilic liquid. Suitable agents for this purpose embrace the known natural and synthetic thickening agents (including derivatives of both), specifically including those alluded to in "Thickening Agents Used in Pharmacy," by Charles H. Becker, American Professional Pharmacist 20:939, October 1954, such as acacia, tragacanth, methyl cellulose, carboxymethylcellulose, magnesium aluminum silicate, and the like, as well as other thickening agents such as the polyglycols, glycerin, syrups, and the like. The specific amounts of these materials may vary with the particular agent of the system involved and can be readily determined by routine experimentation.

The wall-forming material is a macromolecular polymer which has the property of being substantially immiscible with the external phase of the primary emulsion. Moreover, the wall-forming material should be capable of forming polymer-rich and polymer-poor liquid phases when in the environment of a solvent therefor and appropriate coacervating conditions.

Hereafter described, by way of illustrating the invention are coacervation techniques for forming capsular walls of polymeric material utilizing simple and complex coacervation systems, each system in turn being illustrated by examples of natural and synthetic polymers (colloids). While the invention is illustrated by describing coacervation procedures wherein the coacervation occurs in the presence of the primary emulsion, i.e., the primary emulsion is added to the system prior to coacervation, it is to be understood, as mentioned above, that the order of addition of the several components of the total system is not critical, nor is it critical to form an initial solution of the wall-forming polymer and subsequently phase separate. It is within the scope of the invention to introduce the several materials at predetermined concentration under appropriate environmental conditions to establish coacervate-equilibrium liquid phases without resort to separation from an initial solution of the wall-forming polymer. Moreover, the systems illustrated employ an aqueous vehicle, however, other equilibrium liquids may be employed, their selection being determined to meet the criteria of the system as broadly described above.

The term coacervating colloid refers to the wall-forming macromolecular polymer in an aqueous solution, which on the occurrence of coacervation forms liquid colloid-rich and colloid-poor phases, the colloid-rich phase depositing about single or aggregated primary emulsion particles and the colloid-poor phase constituting the liquid equilibrium.

The term coacervating agent refers to materials or system environmental changes capable of initiating the separation of a colloid-rich phase and a colloid-poor phase from an original single phase colloidal solution, either alone or in combination. Examples of materials useful for initiating coacervation include (1) aqueous solutions of electrolytes, including organic and inorganic salts, e.g., salts having alkaline earth or alkali-metal cations such as sodium, ammonium, magnesium, potassium, etc., and organic or inorganic anions such as sulfate, phosphate, acetate, formate, etc., and (2) liquids which are water-soluble and in which the coacervating colloid is less soluble than in water. A critical concentration exists for each coacervating agent below which coacervation will not occur. This concentration may be determined for each combination of coacervating colloid and coacervating agent by routine testing.

The term coacervating solution applies to the solution of the coacervating colloid, together with any coacervating agent, both as defined above, prior to the separation of the aforesaid colloid-rich phase (coacervate).

The term secondary emulsion refers to the emulsion formed when the primary emulsion is added to the coacervating solution before coacervation takes place. The said secondary emulsion is in effect a double emulsion comprising the said primary emulsion dispersed in the coacervating solution and exists as an entity of the mixture only until a coacervate is formed about the particles of the primary emulsion.

In the preparation of the primary emulsion, conventional emulsifying agents are normally employed, as previously indicated, to facilitate the establishment of and contribute to the stability of the primary emulsion, as well as to assure that the correct type of emulsion, i.e., lipophilic liquid-in-hydrophilic liquid, is obtained. Since the size of the ultimate capsules depend in part on the size of the droplets of the primary emulsion, the degree of dispersion of the lipophilic liquid in the hydrophilic liquid should be regulated in accordance with the desired particle size of the ultimate capsule.

The temperature at which the primary emulsion is prepared is of little consequence with respect to the functioning of the present process. However, in the case of a temperature gelable polymer it is necessary that the temperature at which wrapping of the primary emulsion is carried out be above the gel point of the wall-forming polymer. Moreover, in as much as a thickening agent is present in the hydrophilic liquid of the primary emulsion, the temperature of the system should be within or closely approaching the gelling or thickening range of the thickening agent. For example, where methyl cellulose is employed as the thickening agent, and a temperature gelable polymer is the wall-forming material, the temperature of the system should be about 50° C. After the coacervate has enveloped the emulsion particles, the temperature is lowered below the gel point of the coacervating polymer. Where gelatin is employed as the wall-forming polymer component, reduction in the temperature to 30° C. or lower, depending on the type of gelatin used, preferably to about 5 degrees centigrade, produces the desired gelation.

As indicated previously, the secondary emulsion exists during the interval between the first contact of all ingredients of the coacervating solution and the actual formation of the coacervate. The secondary emulsion is a double emulsion consisting of particles of the primary emulsion as the internal phase dispersed in the coacervating solution as the external phase. If the primary emulsion and the coacervating agent (in this instance, a substance that induces coacervation) are added to the solution of the coacervating colloid, the double or secondary emulsion persists until the concentration of the coacervating agent reaches the necessary level at which coacervation occurs. Where, for example, sodium sulfate solution is employed as the coacervating material, the critical concentration with gelatin as the coacervating colloid has been found to be approximately 7%. However, where, as by the preferred sequence, the coacervating colloid and the primary emulsion are added to the coacervating agent, a sufficient concentration of the coacervating agent is present at all times during the said addition, and accordingly the secondary emulsion persists for only a short interval before coacervation takes place. Where the coacervating agent is a solvent in which the colloid is less soluble than it is in water, the solvent is added slowly to a mixture of the primary emulsion and the coacervating colloid with constant stirring to form the secondary emulsion. When the critical concentration range is reached for the particular colloid and solvent involved, coacervation occurs.

The ultimate particle size of the capsules produced is dependent in part, as heretofore indicated, on the degree of dispersion or size of the emulsion particles of the primary emulsion. In addition, the capsule size is of course a function of the thickness of the coacervate coating. Also of importance in this regard is the degree of dispersion of the primary emulsion and coacervating colloid in the coacervating agent. The more complete and rapid the mixing, the smaller are the primary emulsion droplets that are presented as nuclei about which the coacervate will form, and hence the smaller will be the final coacervate units.

The gelling or hardening step is significant with respect to the permeability of the coacervate membrane. In the case where the wall-forming polymer is a temperature-gelable polymer, the coacervate coating may be gelled by lowering the temperature below the gelation point. In the instance of non-temperature-gelable wall-forming polymers, the gelling of the coacervate walls may be induced, for example, by chemical additives which bring about further chemical reaction and consequent insolubilization of the wall-forming polymer. With many coacervate systems, instantaneous gelling of the warm coacervate, as by adding the warm coacervate to ice water, produces a coacervate membrane having high permeability. A prolonged period of slow cooling also favors a membrane of high permeability. With many coacervate systems, the lowest permeability (or highest impermeability) is obtained with intermediate cooling rates. Thus, a highly impermeable coacervate coating is produced, in the case of a gelatin coacervate, on cooling the newly-formed coacervate to about 5 degrees centigrade over a period of approximately 30 minutes with continuous stirring. Optionally, the gelled coacervate walls may be further hardened, plasticized, or otherwise treated to adapt them to the intended use. Treating the gelled coacervate (gelatin, for example) with a 37% aqueous solution of formaldehyde under alkaline conditions for about one hour produces a coacervate wall which can then be dried.

Variations in the hardness of the coacervate wall can be obtained by varying the quantity of hardening agent and/or the period of contact therewith. Hardening likewise has considerable influence on the permeability of the coacervate, both with respect to the invasion of environmental fluids which would cause disintegration of the coating and with respect to the containment of active ingredients which would otherwise impart undesirable odor or taste characteristics to the product.

The finally-treated coacervate can be separated by centrifuging, filtering, decanting, or the like. This can be followed by drying by known methods, as by spray drying, freeze drying, air drying, direct heating, and the like, optionally preceded by a washing step, to obtain a product essentially free of surface moisture. Such a product can then be formulated as a dry material.

A convenient and informative test for the integrity of a coacervate wall produced by the method of the present invention involves the incorporation of a soluble dye in the lipophilic liquid phase of the primary emulsion. The coacervate is formed in the manner described, and the resulting material, after gelling and, optionally, after further hardening, is dispersed or immersed in the test liquid. The liquid is gently stirred to thoroughly expose all coacervate surfaces. Any dye escaping from the lipophilic liquid phase through the coacervate shell is readily detectable in the test liquid.

Set forth hereafter are examples of several encapsulation systems broadly divided as to four categories according to the type of wall-forming polymer and type of coacervate, simple or complex.

SIMPLE COACERVATION EMPLOYING A NATURAL GELABLE WALL-FORMING POLYMER

Examples of suitable wall-forming natural, gelable polymers are gelatin, agar-agar, albumen, alginates, casein, pectins, starch, fibrinogen, and the like, the preferred colloid being gelatin.

Example 1

An oil-in-water emulsion is prepared by emulsifying, at 50° C., 50 ml. of corn oil into 50 ml. of water containing 2.5 gm. of methyl cellulose. A gelatin sol comprising 25 gm. of gelatin and 250 ml. of water is heated to 50° C., mixed with the emulsion, and added slowly to 250 ml. of a 20% sodium sulfate solution, also heated to 50° C. The sodium sulfate solution is vigorously stirred throughout the period of addition. The temperature of the mixture is lowered to 5° C. to gel the coacervate. Sufficient 10% sodium hydroxide solution is added to bring the pH to 9.5, followed by hardening of the coacervate with 25 ml. of 37% formaldehyde solution for 1 hour. The hardened coacervate is then filtered, washed and air dried at 80° C.

Example 2

Following the procedure of Example 1 but substituting the same quantities of peanut oil for the corn oil, tragacanth for the methyl cellulose, potassium chloride for the sodium sulfate and fibrinogen for the gelatin, there is produced a coacervate having substantially the same properties as the coacervate produced therein.

Example 3

An oil-in-water emulsion is prepared by emulsifying, at 50° C., 33 ml. of mineral oil into 25 ml. of water containing 2 gm. of magnesium aluminum silicate and 0.5 gm. alizarin cyanide green. A gelatin sol is prepared at 50° C. from 12.5 gm. of gelatin and 125 ml. of water and is thoroughly mixed with the emulsion. The remaining mixture is added slowly to 125 ml. of a 20% sodium sulfate solution containing 37 gm. of acacia, the sodium sulfate solution being vigorously agitated throughout the period of addition to facilitate coacervate formation. The temperature of the equalibrium liquid containing the coacervate-coated emulsion is lowered to 5° C. and 10% sodium hydroxide is added to give a pH of 9.5. Thereafter, 12.5 ml. of 37% formaldehyde solution is added to harden the coacervate shell. After 5 hours, the resulting product is filtered from the mixture, washed and spray dried at 80° C. (exhaust temperature).

Exposure of the above coacervate to acid and alkaline test solutions indicates that a highly impermeable coating has been obtained.

Example 4

Following the procedure of Example 3 but substituting lanolin for the mineral oil as the oil phase of the oil-in-water emulsion, carboxymethylcellulose for the magnesium aluminum silicate as the thickening agent for the water phase of the primary emulsion, ammonium phosphate for the sodium sulfate as the coacervating agent, agar-agar for the gelatin as the coacervating colloid, and tragacanth for the acacia as the thickening agent for the coacervating solution is productive of a coacervate having properties similar to those obtained therein.

Example 5

An oil-in-ethyl alcohol emulsion is prepared by emulsifying, at 50% C., 33 ml. of peanut oil into 25 ml. of ethyl alcohol containing 2 gm. of methyl cellulose. A fibrinogen sol is prepared at 50° C. from 12.5 gm. of fibrinogen and 125 ml. of water and is thoroughly mixed with the emulsion. The resulting mixture is added slowly to 125 ml. of a 20% sodium sulfate solution containing 37 gm. of acacia, the sodium sulfate solution being vigorously agitated throughout the period of addition to facilitate the formation of the coacervate. The temperature is lowered to 5° C. to gel the coacervate and 10% sodium hydroxide is added to bring the pH to 9.5. Thereafter, 12.5 ml. of 37% formaldehyde solution is added to harden the coacervate shell. After standing for 5 hours, the resulting product is filtered from the mixture, washed and freeze dried at −40° C. and 0.01 mm. mercury vacuum.

The procedures of Examples 1 through 5 are likewise operable with other thickening agent for the hydrophilic liquid as previously described which impart to the external phase a quality which enables a coacervate to deposit thereon. Specifically, for example, equivalent amounts of acacia, tragacanth, carboxymethylcellulose, magnesium aluminium silicate, the polyglycols, glycerin, syrups and the like can be employed.

COMPLEX COACERVATION EMPLOYING AT LEAST ONE NATURAL POLYMER AND AT LEAST ONE TEMPERATURE GELABLE POLYMER

The following examples show suitable polymer combinations for complex coacervation.

Example 1

To a solution of 50 gm. of urea in 25 ml. of water is added 15 gm. of methyl cellulose and the mixture heated to 50° C. Fifty milliliters of peanut oil is heated to 50° C. and the oil is emulsified into the aqueous mixture. A solution is made by dispersing 40 gm. of gelatin and 45 gm. of acacia in 400 ml. of water at 50° C. The emulsion is then dispersed in the solution by vigorous stirring, and 1200 ml. of water, previously heated to 50° C., is added dropwise to effect the phase separation. The mixture is then cooled to 5° C. over a period of 30 minutes and maintained at this temperature for an additional 10 minutes. A sufficient amount of 10% sodium hydroxide is added to raise the pH to 9.5, and 40 ml. of 37% formaldehyde solution is added to harden the colloid mantle.

After hardening, the product is filtered, washed with water and air dried at 80° C.

Other thickening agents, such as acacia, tragacanth, carboxymethylcellulose, magnesium aluminum silicate, the polyglycols, glycerin, syrups and the like, in equivalent amounts can be substituted for the methyl cellulose above.

Similarly, other combinations of hydrophilic colloids can be employed, such as combinations selected from agar-agar, albumen, alginates, casein, pectins, starch, fibrinogen, starch acetate phthalate, cellulose acetate phthalate, amylose acetate phthalate, and the like, so long as one of the selected colloids is gelable and one is isoelectric.

Example 2

A suspension is made from 2 gm. of magnesium aluminum silicate and 100 gm. of micronized caffeine in 100 ml. of water at 50° C. Fifty milliliters of corn oil is heated to 50° C. and emulsified into the aqueous suspension. A solution is prepared from 40 gm. of cationic starch and 35 gm. of sodium alginate in 500 ml. of water at 50° C. Sufficient 20% acetic acid is added to adjust the pH to 3.8. The emulsion is then dispersed into the solution by vigorous stirring and 1000 ml. of water, previously heated to 50° C., is added dropwise. The temperature is maintained at 50° C. for 30 minutes then lowered to 5° C. over a period of 30 minutes. The coated emulsion is then separated by centrifugation and spray dried at 80° C. (exhaust temperature).

Example 3

One gram of carboxymethylcellulose and 0.5 gm. alizarin cyanide green are dispersed in 50 ml. of cold water and heated to 50° C. Fifty milliliters of mineral oil is heated to 50° C. and emulsified into the aqueous suspension. Fifty grams of sodium alginate is dispersed in 700 ml. of water at 50° C. and sufficient 10% sodium hydroxide is added to raise the pH to 7. Fifty grams of fibrinogen is dispersed in 700 ml. of cold water, heated to 50° C. and sufficient 10% sodium hydroxide added to adjust the pH to 7. The alginate solution is combined with the fibrinogen solution, and the emulsion is dispersed therein with vigorous agitation. A sufficient amount of 20% acetic acid is added dropwise to adjust the pH to 3.0. The temperature is maintained at 50° C. for 15 minutes, then lowered to 4° C. over a period of 30 minutes and kept at this temperature for 1 hour. The pH is then raised to 8.0 by the addition of 10% sodium carbonate, and 50 ml. of 37% formaldehyde solution is added to harden the coacervate. The encapsulated emulsion is then separated by centrifugation, washed, and freeze-dried at −40° C. under vacuum of 0.01 mm.

Example 4

Two grams of methyl cellulose and 10 gm. of methyl scopolamine bromide are suspended in 40 ml. of water at 45° C. Forty milliliters of safflower oil is heated to 45° C. and emulsified into the aqueous medium. A solution is made of 25 gm. of serum albumin and 25 gm. of gum acacia in 500 ml. of water at 45° C. Sufficient 20% acetic acid is added to lower the pH to 3.0. The emulsion is then dispersed in the solution, and 600 ml. of water, previously heated to 45° C., is added dropwise and with stirring to facilitate the coacervate formation. The temperature is maintained at 45° C. for 30 minutes, then reduced to 40° C. over a period of 30 minutes and maintained at this temperature for two hours. Sufficient 10% sodium hydroxide is added to raise the pH to 9.5. This is followed by the addition of 25 ml. of 37% formaldehyde solution, previously adjusted to pH 9.5 by the addition of 10% sodium hydroxide. The hardened material is then separated by centrifugation, washed, and dried in air at 70° C.

Example 5

One gram of hexachlorophene and 10 gm. of tragacanth are dispersed in 100 ml. of glycerin and heated to 50° C. Fifty milliliters of mineral oil is heated to 50° C. and emulsified into the glycerin mixture. A solution consisting of 10 gm. of corn starch, 25 gm. of gelatin, and 30 gm. of acacia in 1300 ml. of water is prepared at 50° C. A sufficient amount of 10% sodium hydroxide solution is added to raise the pH of the solution to 6.5. The emulsion is then dispersed in the solution by vigorous stirring, and 20% acetic acid solution is added dropwise to lower the pH to 3.9. The temperature is maintained at 50° C. for 30 minutes, then lowered to 4° C. over a period of 30 minutes. The colloid coating is then hardened by adjustment of the pH to 8.0 by the addition of a sufficient amount of 10% sodium carbonate followed by 25 ml. of 37% formaldehyde solution. The hardened material is then washed with water and dried in an air stream at 50° C.

SIMPLE COACERVATION EMPLOYING A SYNTHETIC POLYMER

The synthetic polymers employed are those in which the polymer units comprise both lipophilic and hydrophilic units, i.e., one class of recurring polymer unit is essentially lipophilic in character, e.g., one derived from styrene, an alkyl ring-substituted styrene, an ether, ester or a halogen ring-substituted styrene, an ether or ester-substituted ethylene, and the other major recurring unit is essentially hydrophilic in character, e.g., derived from maleic acid, maleic acid amide, acrylic acid, crotonic acid, or acrylic acid amide. In combination, these lipophilic and hydrophilic units preferably comprise a majority of the polymeric units present in the polymer. Other polymer units may also be present in the copolymer, so long as they are present in minor amounts, i.e., less than either the hydrophilic or lipophilic copolymer units. Included among these copolymers are the hydrolyzed styrene-maleic anhydride copolymers, styrene-maleic acid amide copolymers, the sulfonated polystyrenes, the carbohydrate acetate phthalates, e.g., starch acetate phthalate, cellulose acetate phthalate, and amylose acetate phthalate, polymethacrylic acid, methylvinyl ether-maleic acid copolymer.

Preferred amoung the polymers employed in this invention are the hydroylzed styrene-maleic anhydride copolymers, the anhydride groups of which are preferably at least 50% hydrolyzed. The copolymer can also contain other polymer units in minor amounts, e.g., those derived from acrylonitrile, acrylic acid, methacrylic acid, itaconic acid, ethyl vinyl ether, methyl vinyl ether, vinyl chloride, vinylidene chloride, etc., and the like. As used in the present specification, the term hydrolyzed styrene-maleic anhydride copolymer is meant to include these modifications as well as other modifications in the structure and method of the preparation which do not alter the essential lipophilic and hydrophilic properties of the copolymer.

The preferred copolymers of the present invention can be represented by the following formula:

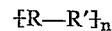

wherein R represents lipophilic polymer units of which more than 70% are styrene residues, the other remaining residues, when present, being those of acrylonitrile, acrylic acid, methacrylic acid, itaconic acid, vinyl chloride, vinylidene chloride, and the like, and R' represents hydrophilic polymer units of which more than 50% are maleic acid units, preferably more than 70% with the ratio of R to R' being from about 1:1 to about 4:1, preferably from 1:1 to about 1.2:1, and $n$ is an integer from about 90 to about 1000. The average molecular weight of the copolymer ranges preferably from about 20,000 to about 200,000.

Copolymers employed in this invention are well known in the art. For example, styrene-maleic anhydride copolymer and Resin SC–2 (the latter being a modified styrene-maleic anhydride copolymer available from Monsanto Chemical Company) can be hydrolyzed to obtain a styrene-maleic acid copolymer. The hydrolysis can be partial or complete and involves a conversion of the acid anhydride linkages to α-dicarboxylic acid units. It is preferred that the hydrolysis be substantially complete, i.e., more than about 50% complete.

The solubility of the polymers employed in this invention varies considerably in selected hydrophilic liquids. For example, completely hydrolyzed styrene-maleic anhydride copolymer is about 2% soluble in water but at least 20% soluble in a 50:50 mixture of methanol and water. Thus, the desired amount of copolymer can be contacted with the lipophilic material by high dilutions in water or, preferably, by the addition of a solubilizing agent, e.g., another hydrophilic liquid. A type of solubilizing agent useful when carboxylic acid polymers are employed are the polysaccharides, e.g., alginates, pectins, methyl cellulose, carboxymethylcellulose, etc. Of particular usefulness are the galactose polysaccharides, e.g., those derived from Irish moss (carrageen), available as SeaKem Type No. 1 from Seaplant Chemical Corporation, New Bedford, Mass. For example, the solubility of completely hydrolyzed styrene-maleic anhydride copolymer in water can be raised from about 2% to about 7 to 10% in the presence of relatively small amounts of this polysaccharide, e.g., one part to four parts of the copolymer.

Between pH 1 and 2.5 (the pH of the normal stomach) a styrene-maleic acid copolymer as defined herein is only 0 to 1% ionized and this is insoluble over this pH range, making the said polymer useful as an enteric coating.

Example 1

Fifty grams of urea and 10 gm. of methyl cellulose are dispersed in 25 ml. of water and heated to 80° C. Forty milliliters of mineral oil is heated to 80° C. and emulsified into the aqueous dispersion by being passed through a hand homogenizer 3 times. Forty grams of styrene-maleic acid copolymer is mixed with 10 gm. of SeaKem Type No. 1 (galactose polysaccharide, Sea Plant Chemical Corp.) and dispersed in 650 ml. of water and heated to 80° C. The emulsion and the copolymer solution are charged in a confluent stream into 175 ml. of 20% sodium sulfate solution, previously heated to 80° C. The mixture is maintained at 80° C. with vigorous stirring for 15 minutes, then charged into a solution of 20 ml. of glacial acetic acid in 500 ml. of ice water. The encapsulated material is then separated by centrifugation, washed with cold water and dried.

Other thickening agents such as acacia, tragacanth, carboxymethylcellulose, magnesium aluminum silicate, the polyglycols, glycerin, syrups and the like, in equivalent amounts, can be substituted for the methyl cellulose above.

Similarly, other synthetic polymers can be substituted for the styrene-maleic acid copolymer above, such as, for example, styrene-maleic acid amide, the sulfonated polystyrenes, starch acetate phthalate, cellulose acetate phthalate, amylose acetate phthalate, polymethacrylic acid, and methylvinyl ether-maleic acid.

Example 2

Emulsify 100 ml. of methyl silicone oil into a solution of 30 gm. of cellulose acetate phthalate in 600 ml. of acetone. Heat the emulsion to 30° C. and add dropwise and with stirring 450 ml. of 2% acetic acid solution. Cool the mixture to room temperature, separate the solution by filtration and wash with 1% hydrochloric acid.

The dried product can be added to hand lotions and pharmaceutical topical preparations in order to increase the water repellancy of these preparations when used on the skin.

Example 3

Twenty-five grams of rotenone and 10 gm. of tragacanth are dispersed in 100 ml. of glycerin and heated to 80° C. One hundred milliliters of corn oil is heated to 80° C. and emulsified into the glycerin dispersion. One hundred grams of styrene-maleic acid copolymer is mixed with 20 gm. of SeaKem, Type No. 1, and dispersed in 1650 ml. of water and heated to 80° C. The emulsion and the copolymer solution are charged in a confluent stream into 450 ml. of 20% ammonium sulfate solution, previously heated to 80° C. The mixture is stirred for 20 minutes at 80° C. then poured into a solution of 50 ml. of glacial acetic acid in 3000 ml. of ice water with constant stirring. The encapsulated material is then separated by centrifugation, washed with water and spray dried at 80° C. (exhaust temperature).

COMPLEX COACERVATION EMPLOYING SYNTHETIC POLYMERS

Example 1

A suspension of 8 gm. of methyl cellulose and 50 gm. of caffeine in 100 ml. of water is heated to 80° C. One hundred milliliters of mineral oil is heated to 80° C. and emulsified into the aqueous suspension. Seventy-five grams of styrene-maleic acid copolymer is dispersed in 1500 ml. of water, heated to 80° C., and sufficient 10% sodium hydroxide is added to dissolve the copolymer. The emulsion is then dispersed in the copolymer solution with agitation. Seventy-five grams of gelatin is dispersed in 500 ml. of water, heated to 80° C., and 10% sodium hydroxide is added to raise the pH to 7. The gelation solution is then added dropwise to the emulsion-copolymer solution with continuous stirring. Immediately thereafter is added dropwise a sufficient amount of 20% acetic acid solution to bring the pH of the mixture down to 3.9. The material is maintained at 80° C. for 15 minutes, then cooled to 4° C. over a period of 30 minutes. To harden the coacervate 75 ml. of 37% formaldehyde solution is added, followed by the dropwise addition of 10% sodium hydroxide to bring the pH up to 8. The hardened material is then separated by centrifugation, washed with 2% hydrochloric acid and air dried.

Other thickening agents can be substituted for the methyl cellulose above in equal amounts, such as, for example, acacia, tragacanth, carboxymethylcellulose, magnesium aluminum silicate, the polyglycols, glycerin, syrups and the like.

Similarly, other hydrophilic colloids such as agar-agar, albumen, fibrinogen, and the like, together with other synthetic polymers such as styrene-maleic acid amide, the sulfonated polystyrenes, starch acetate phthalate, cellulose acetate phthalate, amylose acetate phthalate, polymehacrylic acid, and methylvinyl ether-maleic acid are substitutes for the styrene-maleic acid above.

Example 2

Twenty-five grams of rotenone and 2.5 gm. of magnesium aluminum silicate are dispersed in 50 ml. of water at 50° C. Fifty milliliters of corn oil is heated to 50° C. and emulsified into the aqueous suspension. A solution is prepared by dispersing 25 gm. of cellulose acetate phthalate and 25 gm. of fibrinogen in 300 ml. of water, and sufficient 10% hydrochloric acid is added to adjust the pH to 3.0. The emulsion is dispersed in the solution with vigorous agitation, and 500 ml. of water, previously heated to 50° C., is added dropwise with continuous stirring. The temperature is maintained at 50° C. for 30 min., then lowered to 4° C. over a period of 30 min. and maintained at this point for 1 hour. In order to harden the encapsulated product, 25 ml. of 37% formaldehyde solution is added dropwise, followed by a sufficient amount of 10% sodium hydroxide to raise the pH to 9.0. After the formaldehyde has remained in contact with the mixture for 1 hour, the solids are separated by centrifugation, washed with water, and spray dried at 80° C. (exhaust temperature).

Example 3

Ten grams of carboxymethylcellulose and 1 gm. of alizarin cyanide green are dispersed in 100 ml. of water at 50° C. Fifty milliliters of peanut oil is heated to 50° C. and emulsified into the aqueous dispersion. Fifty grams of styrene-maleic acid amide copolymer is dissolved in 400 ml. of water at 50° C. and sufficient 20% acetic acid is added to adjust the pH to 3.0. Fifty grams of serum albumen is dispersed in 300 ml. of cold water, heated to 50° C., and sufficient 20% acetic acid is added to adjust the pH to 3.0. The copolymer solution is then combined with the albumen solution and the emulsion is dispersed therein with continuous agitation. Four hundred milliliters of water, previously heated to 50° C., is added dropwise to the emulsion-solution mixture. The temperature is then lowered to 4° C. over a period of 30 min. The pH of the material is then raised to 8.5 by the addition of 10% sodium carbonate solution and 50 ml. of 37% formaldehyde solution is added to harden the coating. The hardened product is separated by filtration, washed with water, and spray dried.

Example 4

A mixture of 25 gm. of urea and 5 gm. of tragacanth is dispersed in 50 ml. of glycerin and heated to 80° C. Fifty milliliters of mineral oil is heated to 80° C. and emulsified into the glycerin dispersion. A mixture of 5 gm. of SeaKem Type No. 1 (galactose polysaccharide, Seaplant Chemical Company) and 25 gm. of styrene-maleic acid copolymer is dispersed in 500 ml. of water at 80° C. With continuous stirring, the emulsion is dispersed in the copolymer solution. A gelatin solution is made by dissolving 25 gm. of gelatin in 500 ml. of water at 80° C. The gelatin solution is added dropwise to the copolymer-emulsion mixture with continuous stirring. The temperature of the material is then lowered to 4° C. over a period of 30 min., and stirring is continued at this temperature for one hour. The encapsulated product is hardened by treatment with 37% formaldehyde solution for 4 hours. The hardened material is washed with water and air dried at 50° C.

It is to be understood that the invention is not to be limited to the exact details of operation or exact compositions shown and described herein as obvious modifications and equivalents will be apparent to one skilled in the art, and the invention is therefore to be limited only by the scope of the appended claims.

We claim:
1. A process for coating particles of a lipophilic-liquid-in-hydrophilic-liquid emulsion by a coacervate, comprising:
 (a) establishing an agitated system comprising a liquid vehicle forming a continuous first phase, a second phase dispersed therein consisting of minute, mobile entities of a lipophilic - liquid - in - hydrophlic-liqud emulsion having a thickening agent in the hydrophilic phase, and a third phase dispersed in said first phase and comprising a coacervate solution of a wall-forming polymer material, the said three phases being mutually immiscible but compatible and said first and third phases being maintained in a coacervate-equilibrium-liquid relationship by the presence of a coacervating agent whereby the coacervate deposits about the emulsion particles; and
 (b) hardening the coacervate deposit so formed.

2. A process for coating particles of a lipophilic-liquid-in-hydrophilic-liquid emulsion by coacervation, comprising:
 (a) forming a primary lipophilic-liquid-in-hydrophilic-liquid emulsion having a thickening agent in the hydrophilic phase;
 (b) admixing said emulsion and an aqueous solution of a hydrophilic wall-forming polymer to form a secondary emulsion wherein the solution is the continuous phase;
 (c) causing a coacervate of the wall-forming polymer to separate from the solution and to deposit about the lipophilic-liquid-in-hydrophilic-liquid emulsion particles; and
 (d) hardening the coacervate deposit so formed.

3. A process in accordance with claim 2 wherein the coacervate is formed by introducing the primary emulsion and the aqueous solution of the hydrophilic polymer into an aqueous solution of a coacervating agent.

4. A process for coating particles of lipophilic liquid in-hydrophilic liquid emulsion by coacervation which comprises:
 (a) forming a primary lipophilic liquid-in-hydrophilic liquid emulsion having a thickening agent in the hydrophilic phase;
 (b) admixing the said primary emulsion and an aqueous solution of a temperature-gelable hydrophilic wall-forming polymer to form a secondary emulsion wherein the solution is the continuous phase;
 (c) causing a coacervate of the hydrophilic polymer to separate from the solution and to deposit around the particles of the emulsion at a temperature above the gel point of said polymer; and
 (d) hardening the coacervate deposit so formed by lowering the temperature below the gel point of the gelable wall-forming polymer.

5. The process of claim·4 wherein the coacervate is formed by introducing the primary emulsion and the aqueous solution of the hydrophilic polymer into an aqueous solution of a coacervating agent.

6. The process for coating particles of a lipophilic liquid-in-hydrophilic liquid emulsion by coacervation which comprises:
 (a) forming a primary lipophilic liquid in hydrophilic liquid emulsion having a thickening agent in the hydrophilic phase;
 (b) admixing the said emulsion and an aqueous solution of at least two hydrophilic wall-forming polymers to produce a secondary emulsion wherein the solution is the continuous phase;
 (c) causing a complex coacervate to separate from the solution and to deposit about the particles of the primary emulsion; and
 (d) hardening the coacervate deposit so formed.

7. The process of claim 6 wherein the coacervate is formed by introducing the primary emulsion and the aqueous solution of the hydrophilic polymer into an aqueous solution a coacervating agent.

8. A process for coating particles of a lipophilic liquid-in-hiydrophilic liquid emulsion by coacervation which comprises:
 (a) forming a primary lipophilic liquid-in-hydrophilic liquid emulsion having a thickening agent in the hydrophilic phase;
 (b) admixing the said primary emulsion and an aqueous solution of at least two hydrophilic wall-forming polymers, at least one of which is temperature gelable and at least one of which is isoelectric, to produce a secondary emulsion wherein the solution is the continuous phase;
 (c) causing a coacervate of the hydrophilic polymers to separate from the solution and to deposit around the particles of primary emulsion at a temperature above the gel point of the gelable polymer; and
 (d) hardening the coacervate deposit so formed by lowering the temperature below the gel point of the gelable wall-forming polymer.

9. The process of claim 8 wherein the coacervate is formed by introducing the primary emulsion and the aqueous solution of the hydrophilic polymer into an aqueous solution of a coacervating agent.

10. The process for coating particles of an oil-in-aqueous liquid emulsion by coacervation which comprises:

(1) forming a primary oil-in-aqueous liquid emulsion containing in the aqueous liquid phase a water-thickening agent substantially insoluble in the oil phase, and (2) mixing together the said primary emulsion, an aqueous sol of a gelable hydrophilic colloid, and a coacervating agent, at a temperature above the gel point of the said colloid, to produce a secondary emulsion in which the intact primary emulsion particles are coated by the rapidly-formed coacervate.

11. The process for coating particles of an oil-in-aqueous liquid emulsion by coacervation which comprises: (1) forming a primary oil-in-aqueous liquid emulsion containing in the aqueous liquid phase a water thickening agent substantially insoluble in the oil phase, (2) mixing together the said primary emulsion, an aqueous sol of a gelable hydrophilic colloid, a water-thickening agent as above described, and a coacervating agent, at a temperature above the gel point of the said colloid, to produce a secondary emulsion in which the intact emulsion particles are coated by the rapidly-formed coacervate, (3) cooling the coacervate-coated particles to the gel point of the said colloid, (4) separating the cooled coacervate-coated particles, and (5) drying the separated coacervate-coated particles to obtain a product having an essentially dry surface.

12. The process for coating particles of an oil-in-aqueous liquid emulsion by coacervation which comprises: (1) forming an oil-in-aqueous liquid emulsion containing methyl cellulose in the aqueous liquid phase (2) mixing together the said primary emulsion, methyl cellulose, gelatin and sodium sulfate, at a temperature above about 50° C., to produce a secondary emulsion in which the intact primary emulsion particles are coated by the rapidly-formed coacervate (3) cooling the coacervate-coated particles to about 5° C. (4) separating the cooled coacervate-coated particles, and (5) drying the separated coacervate-coated particles to obtain a product having an essentially dry surface.

13. An oil-in-aqueous liquid emulsion enclosed in a coacervate coating, the said coacervate containing a single gelable hydrophilic colloid.

14. An oil-in-aqueous liquid emulsion enclosed in an essentially dry coacervate coating, the aqueous liquid phase of the said emulsion containing a water-thickening agent substantially insoluble in the oil phase, the said coacervate containing a single gelable hydrophilic colloid.

15. An oil-in-aqueous liquid emulsion enclosed in an essentially dry gelatin coacervate coating, the aqueous liquid phase of the said emulsion containing methyl cellulose.

16. The process for coating particles of an oil-in-aqueous liquid emulsion by coacervation which comprises: (1) forming a primary oil-in-aqueous liquid emulsion containing a water-thickening agent substantially insoluble in the oil phase, and (2) mixing together the said primary emulsion, an aqueous sol of at least two hydrophilic colloids, at least one of which is gelable and at least one of which is isoelectric, at a temperature above the gel point of the said gelable colloid, to produce a secondary emulsion, and (3) causing a coacervate to deposit about the particles of the said secondary emulsion.

17. The process for coating particles of an oil-in-aqueous liquid emulsion by coacervation which comprises: (1) forming a primary oil-in-aqueous liquid emulsion containing in the aqueous liquid phase a water-thickening agent substantially insoluble in the oil phase, (2) mixing together the said primary emulsion, an aqueous sol of at least two hydrophilic colloids, at least one of which is gelable and at least one of which is isoelectric, at a temperature above the gel point of the said gelable colloid, to produce a secondary emulsion, (3) causing a coacervate to deposit about the particles of the said secondary emulsion, (4) cooling the coacervate-coated particles to the gel point of the said gelable colloid, (5) separating the cooled coacervate-coated particles, and (6) drying the separated coacervate-coated particles to obtain a product having an essentially dry surface.

18. The process for coating particles of an oil-in-aqueous liquid emulsion by coacervation which comprises: (1) forming a primary oil-in-aqueous liquid emulsion containing methyl cellulose in the aqueous liquid phase, (2) mixing together the said primary emulsion, gelatin and acacia, at a temperature above about 80 degrees centigrade, (3) diluting the said secondary emulsion with water to cause a coacervative to deposit about the particles of the said secondary emulsion, (4) cooling the coacervate-coated particles to about 5 degrees centigrade, (5) separating the cooled coacervate-coated particles, and (6) drying the separated coacervate-coated particles to obtain a product having an essentially dry surface.

19. An oil-in-aqueous liquid emulsion enclosed in a coacervate coating, the said coacervate containing at least two hydrophilic colloids, at least one of which is gelable and at least one of which is isoelectric.

20. An oil-in-aqueous liquid emulsion enclosed in an essentially dry coacervate coating, the aqueous liquid phase of the said emulsion containing a water-thickening agent substantially insoluble in the oil phase, the said coacervate coating containing at least two hydrophilic colloids, at least one of which is gelable and at least one of which is isoelectric.

21. An oil-in-aqueous liquid emulsion enclosed in an essentially dry gelatin and acacia coacervate coating, the aqueous liquid phase of the said emulsion containing methyl cellulose.

22. The process for coating particles of an oil-in-aqueous liquid emulsion by coacervation which comprises: (1) forming a primary oil-in-aqueous liquid emulsion containing in the aqueous liquid phase a water-thickening agent substantially insoluble in the oil phase, and (2) mixing together the said primary emulsion, an aqueous dispersion of styrene maleic anhydride copolymer, the anhydride groups of which are at least about 50% hydrolyzed, and a coacervating agent, to produce a secondary emulsion in which the intact primary emulsion particles are coated by the rapidly-formed coacervate.

23. The process for coating particles of an oil-in-aqueous liquid emulsion by coacervation which comprises: (1) forming a primary oil-in-aqueous liquid emulsion containing in the aqueous liquid phase a water-thickening agent substantially insoluble in the oil phase, (2) mixing together the said primary emulsion, an aqueous dispersion of styrene maleic anhydride copolymer, the anhydride groups of which are at least about 50% hydrolyzed, and a coacervating agent, to produce a secondary emulsion in which the intact emulsion particles are coated by the rapidly-formed coacervate, (3) separating the coacervate-coated particles, and (4) drying the separated coacervate-coated particles to obtain a product having an essentially dry surface.

24. The process for coating particles of an oil-in-aqueous liquid emulsion by coacervation which comprises: (1) forming an oil-in-aqueous liquid emulsion containing methyl cellulose in the aqueous liquid phase, (2) mixing together the said primary emulsion, methyl cellulose, an aqueous dispersion of styrene maleic acid copolymer, at a temperature above about 80 degrees centigrade, and a coacervating agent, to produce a secondary emulsion in which the intact primary emulsion particles are coated by the rapidly-formed coacervate, (3) separating the coacervate-coated particles, and (4) drying the separated coacervate-coated particles to obtain a product having an essentially dry surface.

25. An oil-in-aqueous liquid emulsion enclosed in a coacervate coating, the said coacervate containing styrene maleic anhydride copolymer, the anhydride groups of which are at least about 50% hydrolyzed.

26. An oil-in-aqueous liquid emulsion enclosed in an essentially dry coacervate coating, the aqueous liquid phase of the said emulsion containing a water-thickening agent substantially isoluble in the oil phase, the said coacervate containing styrene maleic anhydride copolymer, the anhydride groups of which are at least about 50% hydrolyzed.

27. An oil-in-aqueous liquid emulsion enclosed in an essentially dry coacervate coating, the liquid phase of the said emulsion containing methyl cellulose, and the said coacervate containing styrene maleic acid copolymer.

28. The process for coating particles of an oil-in-aqueous liquid emulsion by coacervation which comprises: (1) forming a primary oil-in-aqueous liquid emulsion containing in the aqueous liquid phase a water-thickening agent substantially insoluble in the oil phase, (2) mixing together the said primary emulsion, an aqueous dispersion of a hydrophilic colloid and styrene maleic anhydride copolymer, the anhydride groups of which are at least about 50% hydrolyzed, to produce a secondary emulsion, and (3) causing a coacerate to deposit about the particles of the said secondary emulsion.

29. The process for coating particles of an oil-in-aqueous liquid emulsion by coacervation which comprises: (1) forming a primary oil-in-aqueous-liquid-emulsion containing in the aqueous liquid phase a water-thickening agent substantially insoluble in the oil phase, (2) mixing together the said primary emulsion, an aqueous dispersion of a hydrophilic colloid and styrene maleic anhydride copolymer, the anhydride groups of which are at least about 50% hydrolyzed, to produce a secondary emulsion, (3) causing a coacervate to deposit about the particles of the said secondary emulsion, (4) separating the coacervate-coated particles, and (5) drying the separated coacervate-coated particles to obtain a product having an essentially dry surface.

30. The process for coating particles of an oil-in-aqueous liquid emulsion by coacervation which comprises: (1) forming an oil-in-aqueous liquid emulsion containing methyl cellulose in the aqueous liquid phase, (2) mixing together the said primary emulsion, gelatin, and styrene maleic acid copolymer, at a temperature above about 80 degrees centigrade, to produce a secondary emulsion, (3) causing a coacervate to deposit about the particles of the said secondary emulsion, (4) cooling the coacervate-coated particles to about 5 degrees centigrade, (5) separating the cooled coacervate-coated particles, and (6) drying the separated coacervate-coated particles to obtain a product having an essentially dry surface.

31. An oil-in-aqueous liquid emulsion enclosed in a coacervate coating, the said coacervate containing a hydrophilic colloid and styrene maleic anhydride copolymer, the anhydride groups of which are at least about 50% hydrolyzed.

32. An oil-in-aqueous liquid emulsion enclosed in an essentially dry coacervate coating, the aqueous liquid phase of the said emulsion containing a water-thickening agent substantially insoluble in the oil phase, and the said coacervate containing a hydrophilic colloid and styrene maleic anhydride copolymer, the anhydride groups of which are at least about 50% hydrolyzed.

33. An oil-in-aqueous-liquid emulsion enclosed in an essentially dry coacervate coating, the aqueous liquid phase of the said emulsion containing methyl cellulose, and the coacervate containing gelatin and styrene maleic acid copolymer.

References Cited

UNITED STATES PATENTS

| | | | |
|---|---|---|---|
| 2,800,457 | 7/1957 | Green et al. | 252—316 |
| 2,800,458 | 7/1957 | Green | 252—316 |
| 2,897,121 | 7/1959 | Wagner | 424—33 |
| 2,969,330 | 1/1961 | Brynko | 252—316 |
| 2,969,331 | 1/1961 | Brynko et al. | 252—316 |

RICHARD D. LOVERING, Primary Examiner

U.S. Cl. X.R.

71—119; 117—100; 424—33, 34, 35, 36, 37